United States Patent
Josiam et al.

(10) Patent No.: US 8,204,147 B2
(45) Date of Patent: Jun. 19, 2012

(54) METHODS TO INDEX THE PREAMBLES IN THE BANDWIDTH REQUEST CHANNEL

(75) Inventors: Kaushik Josiam, Dallas, TX (US); Zhouyue Pi, Allen, TX (US); Ying Li, Garland, TX (US); Hwasun Yoo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 113 days.

(21) Appl. No.: 12/783,235

(22) Filed: May 19, 2010

(65) Prior Publication Data
US 2011/0013717 A1 Jan. 20, 2011

Related U.S. Application Data

(60) Provisional application No. 61/270,897, filed on Jul. 14, 2009.

(51) Int. Cl.
*H04L 27/00* (2006.01)
(52) U.S. Cl. .......................... 375/295; 455/103; 370/320
(58) Field of Classification Search .................. 375/260, 375/295; 455/103; 370/320
See application file for complete search history.

(56) References Cited

U.S. PATENT DOCUMENTS
2002/0114297 A1* 8/2002 Karna et al. ................. 370/335
2002/0159412 A1* 10/2002 Odenwalder et al. ......... 370/335

FOREIGN PATENT DOCUMENTS
KR 10-2005-0029395 3/2005
WO WO 2005/040960 A2 5/2005
WO WO 2007/024101 A1 3/2007

OTHER PUBLICATIONS
International Search Report dated Jan. 25, 2011 in connection with International Patent Application No. PCT/KR2010/004553.

* cited by examiner

*Primary Examiner* — Curtis Odom

(57) ABSTRACT

For use in a wireless communication network, a mobile station configured to determine a preamble sequence from a set of indexed preamble sequences by generating an index of the preamble sequence from a B-bit message is provided. The mobile station is configured to group the B bits of the message into n groups, each group having a substantially equal number of bits. The mobile station is also configured to generate a parity bit from each of the n groups. The mobile station is further configured to determine the index of the preamble sequence based on the n parity bits. The mobile station is still further configured to transmit the preamble sequence corresponding to the index of the preamble sequence. A base station configured to recover the B-bit message using the received signal from the mobile station is also provided.

44 Claims, 6 Drawing Sheets

TIME →

| $Pr_0$ | $Pr_4$ | $Pr_8$ | $Pr_{12}$ | $Pr_{16}$ | $Pr_{20}$ |
|---|---|---|---|---|---|
| $Pr_1$ | $Pr_5$ | $Pr_9$ | $Pr_{13}$ | $Pr_{17}$ | $Pr_{21}$ |
| $M_0$ | $M_6$ | $M_{12}$ | $M_{18}$ | $M_{24}$ | $M_{28}$ |
| $M_1$ | $M_7$ | $M_{13}$ | $M_{19}$ | $M_{25}$ | $M_{29}$ |
| $Pr_2$ | $Pr_6$ | $Pr_{10}$ | $Pr_{14}$ | $Pr_{18}$ | $Pr_{22}$ |
| $Pr_3$ | $Pr_7$ | $Pr_{11}$ | $Pr_{15}$ | $Pr_{19}$ | $Pr_{23}$ |

⋮

| $Pr_0$ | $Pr_4$ | $Pr_8$ | $Pr_{12}$ | $Pr_{16}$ | $Pr_{20}$ |
|---|---|---|---|---|---|
| $Pr_1$ | $Pr_5$ | $Pr_9$ | $Pr_{13}$ | $Pr_{17}$ | $Pr_{21}$ |
| $M_2$ | $M_8$ | $M_{14}$ | $M_{20}$ | $M_{26}$ | $M_{32}$ |
| $M_3$ | $M_9$ | $M_{15}$ | $M_{21}$ | $M_{27}$ | $M_{33}$ |
| $Pr_2$ | $Pr_6$ | $Pr_{10}$ | $Pr_{14}$ | $Pr_{18}$ | $Pr_{22}$ |
| $Pr_3$ | $Pr_7$ | $Pr_{11}$ | $Pr_{15}$ | $Pr_{19}$ | $Pr_{23}$ |

⋮

| $Pr_0$ | $Pr_4$ | $Pr_8$ | $Pr_{12}$ | $Pr_{16}$ | $Pr_{20}$ |
|---|---|---|---|---|---|
| $Pr_1$ | $Pr_5$ | $Pr_9$ | $Pr_{13}$ | $Pr_{17}$ | $Pr_{21}$ |
| $M_4$ | $M_{10}$ | $M_{16}$ | $M_{22}$ | $M_{28}$ | $M_{34}$ |
| $M_6$ | $M_{11}$ | $M_{17}$ | $M_{23}$ | $M_{29}$ | $M_{35}$ |
| $Pr_2$ | $Pr_6$ | $Pr_{10}$ | $Pr_{14}$ | $Pr_{18}$ | $Pr_{22}$ |
| $Pr_3$ | $Pr_7$ | $Pr_{11}$ | $Pr_{15}$ | $Pr_{19}$ | $Pr_{23}$ |

FREQUENCY ↓

METHODS TO INDEX THE PREAMBLES IN THE BANDWIDTH REQUEST CHANNEL

CROSS-REFERENCE TO RELATED APPLICATION(S) AND CLAIM OF PRIORITY

The present application is related to U.S. Provisional Patent Application No. 61/270,897, filed Jul. 14, 2009, entitled "METHODS TO INDEX THE PREAMBLES IN THE BANDWIDTH REQUEST CHANNEL". Provisional Patent Application No. 61/270,897 is assigned to the assignee of the present application and is hereby incorporated by reference into the present application as if fully set forth herein. The present application hereby claims priority under 35 U.S.C. §119(e) to U.S. Provisional Patent Application No. 61/270,897.

TECHNICAL FIELD OF THE INVENTION

The present application relates generally to wireless communications and, more specifically, to indexing preamble sequences in a bandwidth request channel between a mobile station and base station.

BACKGROUND OF THE INVENTION

The IEEE 802.16m amendment allows a mobile station (MS) to transmit bandwidth requests (BWREQ) to indicate to a base station (BS) that it needs uplink (UL) bandwidth allocation. There are multiple methods by which a mobile station can request bandwidth from the base station. These methods include use of a contention based random access based bandwidth request indicator, a standalone bandwidth request, a piggybacked bandwidth request carried in an extended header in the MAC PDU, and a bandwidth request using fast feedback channel.

In the contention based random access method, multiple mobile stations contend for a limited set of preamble sequences on a common channel. The 802.16m standard defines 24 orthogonal access sequences, or preamble sequences. Each mobile station may choose a preamble sequence at random (out of the 24 possible preamble sequences), and hope that no other mobile station chooses that preamble sequence. If another mobile happens to choose the same preamble sequence, then the two preamble sequences are said to have collided at the BS.

SUMMARY OF THE INVENTION

For use in a wireless communication network, a mobile station configured to determine a preamble sequence from a set of indexed preamble sequences by generating an index of the preamble sequence from a B-bit message is provided. The mobile station is configured to group the B bits of the message into n groups, each group having a substantially equal number of bits. The mobile station is also configured to generate a parity bit from each of the n groups. The mobile station is further configured to determine the index of the preamble sequence based on the n parity bits. The mobile station is still further configured to transmit the preamble sequence corresponding to the index of the preamble sequence.

For use in a wireless communication network, a base station configured to process a B-bit message from a mobile station is provided. The message includes a preamble sequence and a quick access message. The base station is configured to receive the message from the mobile station. The base station is also configured to determine a preamble index corresponding to the received preamble sequence, the preamble index corresponding to n parity bits. The base station is also configured to determine a (B-n) bit portion of the B bit message from the quick access message. The base station is further configured to group the (B-n) bits into n groups, each group having a substantially equal number of bits. The base station is still further configured to distribute the n parity bits to the n groups. The base station is also configured to recover the n bit portion of the B bit message using a bit-wise XOR operation on the bits in the each of the n groups.

For use in a wireless communication network, a mobile station configured to determine a preamble sequence from a set of indexed preamble sequences by generating an index of the preamble sequence from a message is provided. The message has B bits, $B_{MS}$ bits of the B bits comprising a mobile station ID and $(B-B_{MS})$ of the B bits comprising a bandwidth indicator. The mobile station is configured to generate a plurality of parity bits from the BMS station ID bits. The mobile station is also configured to generate a plurality of preamble bits from the plurality of parity bits. The mobile station is further configured to replace a final plurality of bits of the B-bit quick access message with the plurality of preamble bits.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 6 depicts a resource structure for the bandwidth request using the OFDMA physical layer, for use with embodiments of the present disclosure.

DETAILED DESCRIPTION OF THE INVENTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications network.

The following documents and standards descriptions are hereby incorporated into the present disclosure as if fully set forth herein:

IEEE C802.16m-09/0010r2, IEEE 802.16 Amendment Working Document, Editor: Ron Murias, June 2009 (hereinafter the "0010r2" document); and IEEE C802.16m-08/0003r9a, IEEE 802.16m System Description Document, Editor: Shkumbin Hamiti, June 2009 (hereinafter the "0003r9a" document).

The embodiments of this disclosure provide methods to index preamble sequences in a bandwidth request channel. The disclosed embodiments are based on use of a contention based random access based bandwidth request indicator. However, it will be understood that other bandwidth request methods may be used with this disclosure.

Figure 1:
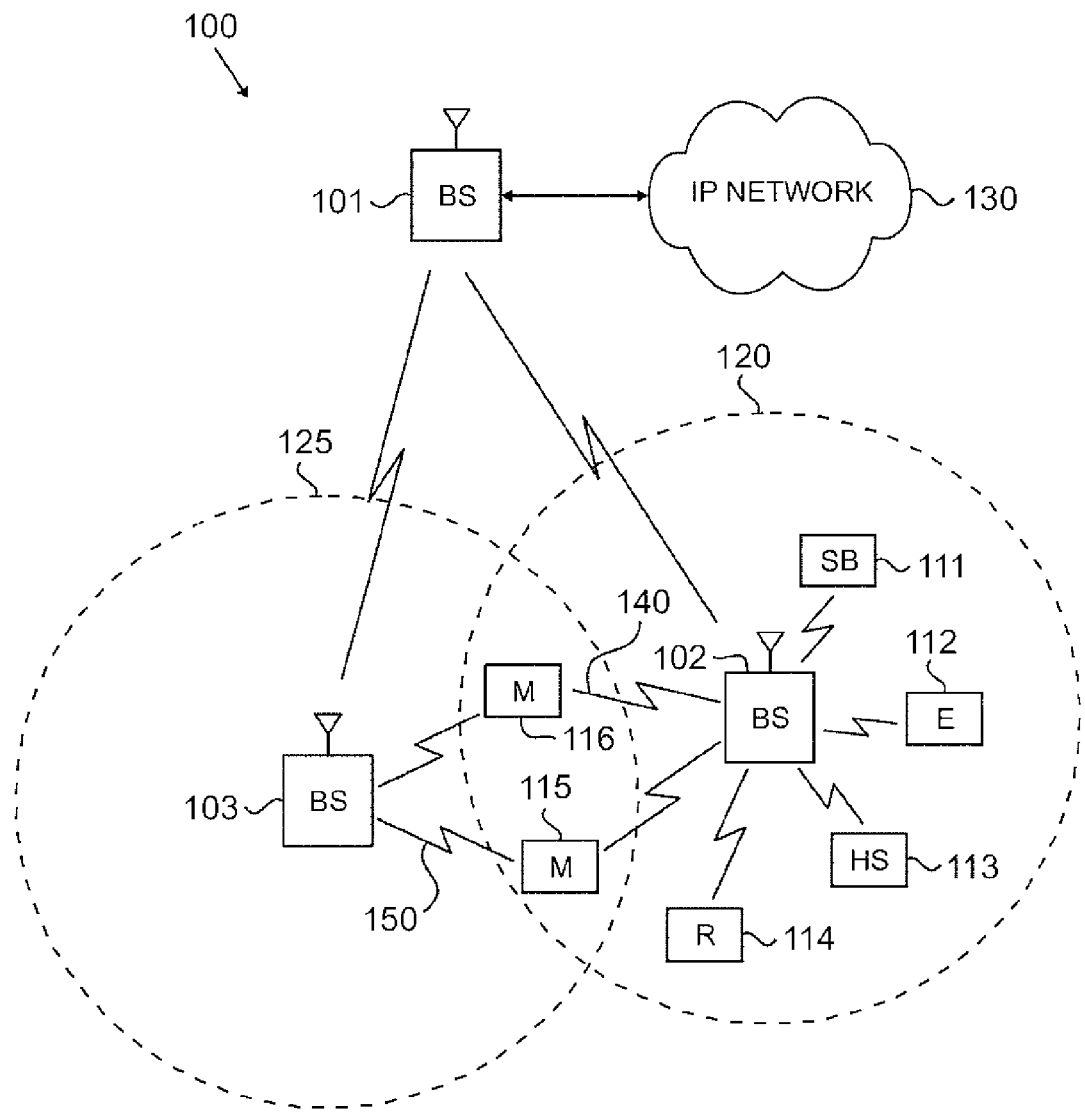
FIG. 1 illustrates an exemplary wireless network according to one embodiment of the present disclosure.

FIG. 1 illustrates an exemplary wireless network 100 according to one embodiment of the present disclosure. In the illustrated embodiment, wireless network 100 includes base station (BS) 101, base station (BS) 102, and base station (BS) 103. Base station 101 communicates with base station 102 and base station 103. Base station 101 also communicates with Internet protocol (IP) network 130, such as the Internet, a proprietary IP network, or other data network.

Base station 102 provides wireless broadband access to network 130, via base station 101, to a plurality of subscriber stations within coverage area 120 of base station 102. The first plurality of subscriber stations includes subscriber station (SS) 111, subscriber station (SS) 112, subscriber station (SS) 113, subscriber station (SS) 114, subscriber station (SS) 115 and subscriber station (SS) 116. Subscriber stations 111-116 may be any wireless communication device, such as, but not limited to, a mobile phone, mobile PDA and any mobile station (MS). In an exemplary embodiment, SS 111 may be located in a small business (SB), SS 112 may be located in an enterprise (E), SS 113 may be located in a WiFi hotspot (HS), SS 114 may be located in a residence, and SS 115 and SS 116 may be mobile devices.

Base station 103 provides wireless broadband access to network 130, via base station 101, to a plurality of subscriber stations within coverage area 125 of base station 103. The plurality of subscriber stations within coverage area 125 includes subscriber station 115 and subscriber station 116. In alternate embodiments, base stations 102 and 103 may be connected directly to the Internet by means of a wired broadband connection, such as an optical fiber, DSL, cable or T1/E1 line, rather than indirectly through base station 101.

In other embodiments, base station 101 may be in communication with either fewer or more base stations. Furthermore, while only six subscriber stations are shown in FIG. 1, it is understood that wireless network 100 may provide wireless broadband access to more than six subscriber stations. It is noted that subscriber station 115 and subscriber station 116 are on the edge of both coverage area 120 and coverage area 125. Subscriber station 115 and subscriber station 116 each communicate with both base station 102 and base station 103 and may be said to be cell-edge devices interfering with each other. For example, the communications between BS 102 and SS 116 may be interfering with the communications between BS 103 and SS 115. Additionally, the communications between BS 103 and SS 115 may be interfering with the communications between BS 102 and SS 116.

Subscriber stations 111-116 may use the broadband access to network 130 to access voice, data, video, video teleconferencing, and/or other broadband services. In an exemplary embodiment, one or more of subscriber stations 111-116 may be associated with an access point (AP) of a WiFi WLAN. Subscriber station 116 may be any of a number of mobile devices, including a wireless-enabled laptop computer, personal data assistant, notebook, handheld device, or other wireless-enabled device. Subscriber station 114 may be, for example, a wireless-enabled personal computer, a laptop computer, a gateway, or another device.

Dotted lines show the approximate extents of coverage areas 120 and 125, which are shown as approximately circular for the purposes of illustration and explanation only. It should be clearly understood that the coverage areas associated with base stations, for example, coverage areas 120 and 125, may have other shapes, including irregular shapes, depending upon the configuration of the base stations and variations in the radio environment associated with natural and man-made obstructions.

Also, the coverage areas associated with base stations are not constant over time and may be dynamic (expanding or contracting or changing shape) based on changing transmission power levels of the base station and/or the subscriber stations, weather conditions, and other factors. In an embodiment, the radius of the coverage areas of the base stations, for example, coverage areas 120 and 125 of base stations 102 and 103, may extend in the range from less than 2 kilometers to about fifty kilometers from the base stations.

As is well known in the art, a base station, such as base station 101, 102, or 103, may employ directional antennas to support a plurality of sectors within the coverage area. In FIG. 1, base stations 102 and 103 are depicted approximately in the center of coverage areas 120 and 125, respectively. In other embodiments, the use of directional antennas may locate the base station near the edge of the coverage area, for example, at the point of a cone-shaped or pear-shaped coverage area.

Figure 2:
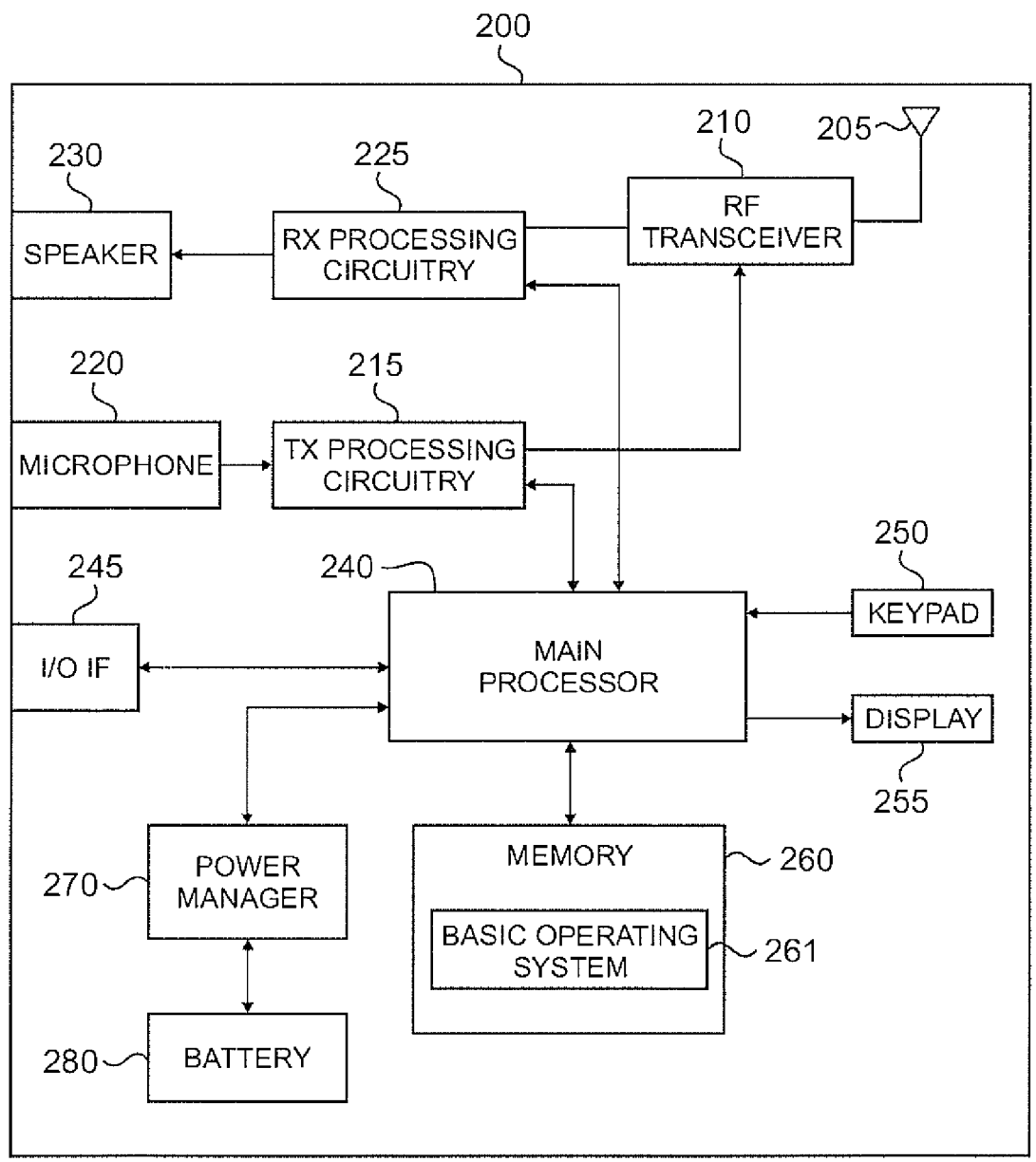
FIG. 2 illustrates a wireless mobile station according to embodiments of the present disclosure.

FIG. 2 illustrates a wireless mobile station 200 according to embodiments of the present disclosure. In certain embodiments, wireless mobile station 200 may represent any of the subscriber stations 111-116 shown in FIG. 1. The embodiment of wireless mobile station (MS) 200 illustrated in FIG. 2 is for illustration only. Other embodiments of wireless mobile station 200 could be used without departing from the scope of this disclosure.

Wireless mobile station 200 comprises antenna 205, radio frequency (RF) transceiver 210, transmit (TX) processing circuitry 215, microphone 220, and receive (RX) processing circuitry 225. Mobile station 200 also comprises speaker 230, main processor 240, input/output (I/O) interface (IF) 245, keypad 250, display 255, memory 260, power manager 270, and battery 280.

Main processor 240 executes basic operating system (OS) program 261 stored in memory 260 in order to control the overall operation of mobile station 200. In one such operation, main processor 240 controls the reception of forward channel signals and the transmission of reverse channel signals by radio frequency (RF) transceiver 210, receiver (RX) processing circuitry 225, and transmitter (TX) processing circuitry 215, in accordance with well-known principles.

Main processor 240 is capable of executing other processes and programs resident in memory 260. Main processor 240 can move data into or out of memory 260, as required by an executing process. Main processor 240 is also coupled to I/O interface 245. The operator of mobile station 200 uses keypad 250 to enter data into mobile station 200. Alternate embodiments may use other types of displays.

A mobile station may transmit bandwidth requests to indicate to a base station that it needs uplink bandwidth allocation. There are multiple methods by which a mobile station can request bandwidth from the base station. These methods include use of a contention based random access based bandwidth request indicator, a standalone bandwidth request, a piggybacked bandwidth request carried in an extended header in the MAC PDU, and a bandwidth request using fast feedback channel.

Two procedures for requesting bandwidth using a contention based random access based bandwidth request indicator are now described. The two procedures, which may be supported concurrently, include a 5-step procedure and 3-step quick access procedure. The 5-step procedure may be used independently or as a fallback mode for the 3-step quick access procedure in case of a failure in decoding the quick access message.

Figure 3:
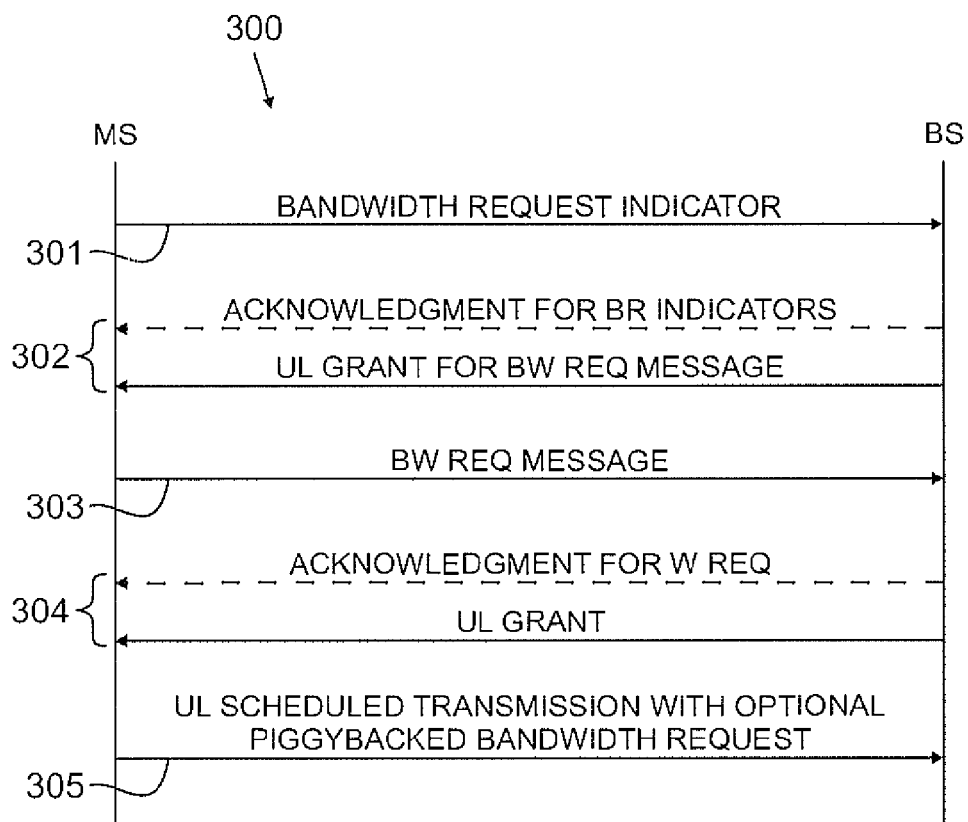
FIG. 3 depicts a 5-step bandwidth request procedure for an IEEE 802.16m-compliant mobile station, according to embodiments of the present disclosure.

FIG. 3 depicts a method incorporating the 5-step bandwidth request procedure for an IEEE 802.16m-compliant mobile station, according to one embodiment of the present disclosure. Method 300 is described with respect to mobile station 200 and base station 102. It is understood, however, that method 300 may be used with any similarly-configured wireless device and base station.

First, mobile station 200 sends a bandwidth request indicator, which is a preamble sequence selected randomly from the set of preamble sequences, to base station 102 in the resource allocated for a bandwidth request channel (step 301). A preamble sequence is a sequence of numbers that belongs to a class of sequences that have desirable properties like orthogonality or low correlation. In the case of IEEE 802.16m, the preamble sequences are all orthogonal.

Next, base station 102 provides a response to the bandwidth request indicator (step 302). The response depends on the success or failure of the decoding. If base station 102 successfully decodes the bandwidth request indicator, it transmits a grant for uplink transmission of the BW REQ header to mobile station 200.

Next, if mobile station 200 receives an uplink grant for the BW REQ header from base station 102, then mobile station 200 transmits a standalone bandwidth request message header to base station 102 in the resource indicated by the uplink grant (step 303). However, if mobile station 200 receives no uplink grant from base station 102, then mobile station 200 considers the bandwidth request as failed and may restart the procedure.

Next, on a successful decoding of the BW REQ header, base station 102 transmits an uplink grant to mobile station 200 (step 304). However, if the decoding fails, base station 102 sends a negative acknowledgement.

Next, assuming an uplink grant has been transmitted by base station 102, mobile station 200 transmits in the allocated resource indicated in the uplink grant (step 305). Alternatively, on receiving a negative acknowledgement, mobile station 200 considers the bandwidth request as failed and may restart the procedure.

Figure 4:
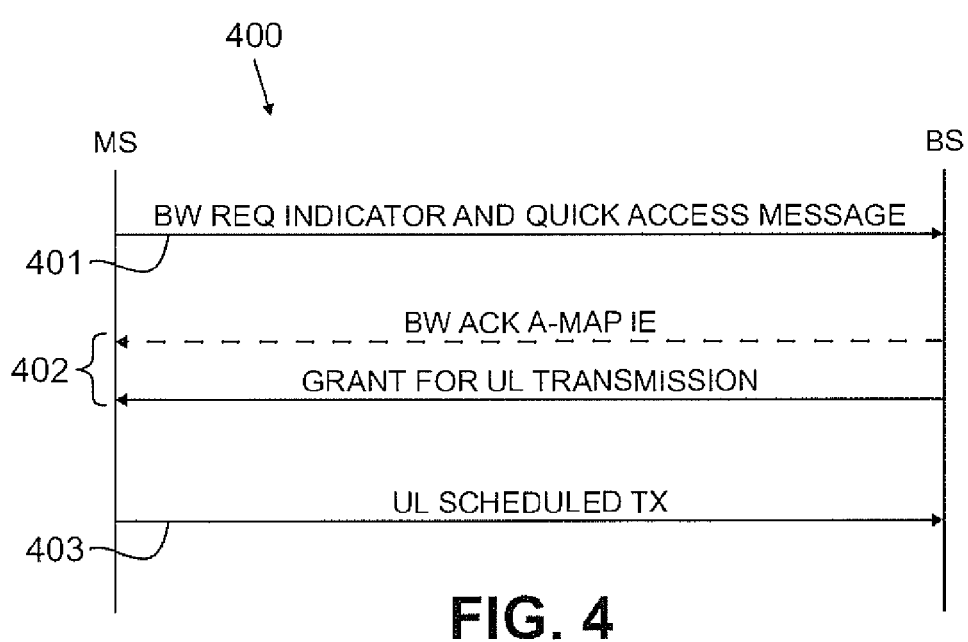
FIG. 4 depicts a 3-step bandwidth request quick access procedure for an IEEE 802.16m-compliant mobile station, according to embodiments of the present disclosure.

FIG. 4 depicts a method incorporating the 3-step bandwidth request quick access procedure for an IEEE 802.16m-compliant mobile station, according to one embodiment of the present disclosure. Method 400 is described with respect to mobile station 200 and base station 102. It is understood, however, that method 400 may be used with any similarly-configured wireless device and base station.

First, mobile station 200 sends a bandwidth request indicator and a quick access message to base station 102 in the resource allocated for a bandwidth request channel (step 401). The quick access message may include information to identify mobile station 200 and also the type of the bandwidth request, including the size of the bandwidth requested. A portion or all of the quick access message is transmitted in the data portion of the BW REQ channel in addition to the preamble sequence transmitted as the BW REQ indicator. In some embodiments, the quick access message is a 16-bit message, including a 12-bit mobile station ID (STID) and a 4-bit bandwidth size/priority indicator (BWSize) (also sometimes referred to as a flow ID). Quick access messages having more or fewer bits are also possible.

Next, base station 102 provides a response to the bandwidth request indicator and quick access message (step 402). The response depends on the success or failure of the decoding of both the preamble sequence and the quick access message. If base station 102 successfully decodes the bandwidth request indicator and quick access message, it transmits either an explicit acknowledgement using a BW ACK A-MAP IE or a grant for uplink transmission to mobile station 200. If base station 102 fails to decode the bandwidth request indicator or the quick access message, then base station 102 transmits a BW ACK A-MAP IE indicating a negative acknowledgement for the corresponding bandwidth request opportunity.

Figure 5:
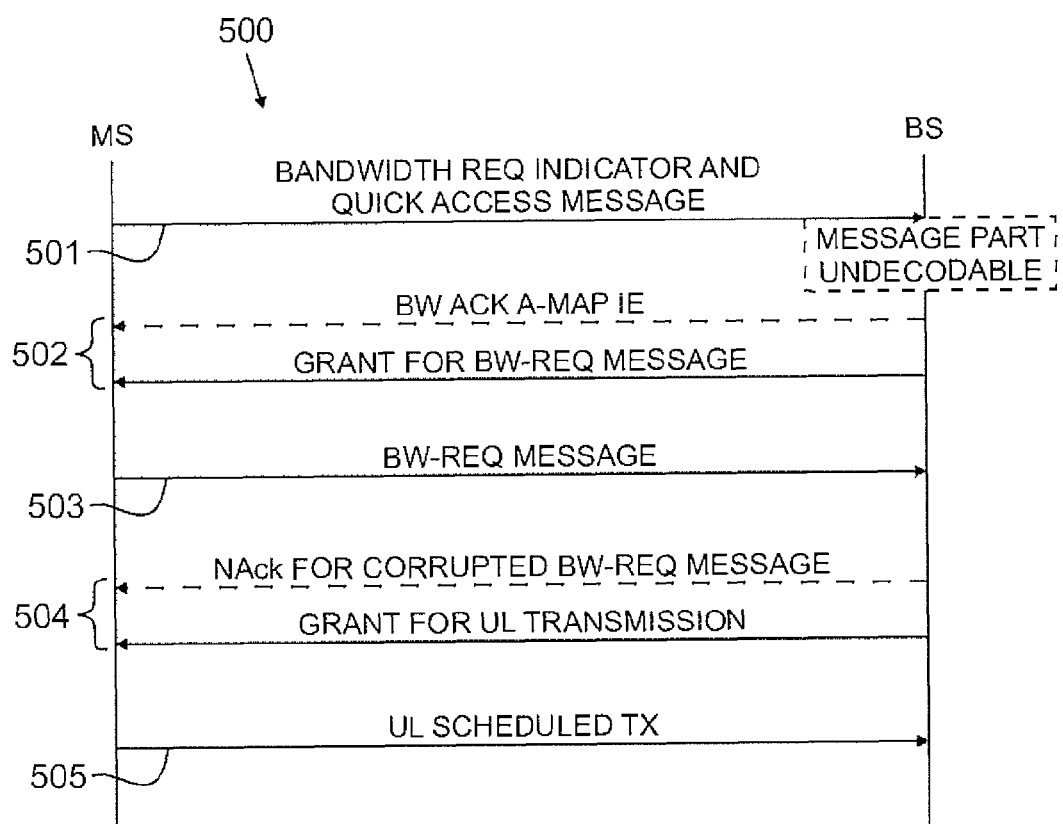
FIG. 5 depicts a 3-step bandwidth request quick access procedure that defaults to a 5-step bandwidth request procedure, according to embodiments of the present disclosure.

Next, assuming an uplink grant has been transmitted by base station 102, mobile station 200 begins transmission of the bandwidth request message (step 403). Alternatively, if mobile station 200 receives a negative acknowledgement indicating a quick access message decoding failure (and an acknowledgement for bandwidth request indicator decoding), or does not receive anything at all, then mobile station 200 starts a bandwidth request timer, and the BWREQ procedure defaults to a standard 5-step procedure, as seen in FIG. 5. In FIG. 5, steps 501 and 502 correspond to steps 401 and 402 in FIG. 4. In step 503, mobile station 200 transmits a standalone bandwidth request message header to base station 102.

If mobile station 200 receives an uplink grant using the default 5-step procedure, then mobile station 200 stops the timer. Alternatively, if it receives a negative ACK or the bandwidth request timer expires, then mobile station 200 considers the bandwidth request as failed and may restart the procedure (step 504).

Next, assuming an uplink grant has been transmitted by base station 102, mobile station 200 transmits in the allocated resource indicated in the uplink grant (step 505).

The 5-step bandwidth request procedure shown in FIG. 5 is a fallback mode for the 3-step bandwidth request procedure shown in FIG. 4. As illustrated in FIG. 5 in step 502, base station 102, using the CDMA ALLOCATION A-MAP IE, grants mobile station 200 an allocation to transmit a standalone bandwidth request header.

The 3-step bandwidth request may be limited to only certain time-critical and frequently used messages. Examples of such time-critical and frequently used messages are:

VoIP(AMR) full rate packet;
VoIP(AMR) SID;
MAC HO-REQ message;
MAC signaling header (bandwidth request header);
RoHC header; and
TCP ACK.

The messages listed above are not exhaustive but are exemplary of the type of messages that can use the 3-step bandwidth request procedure. One common feature of the messages listed above is a computable message size. Thus, if the type of message for which bandwidth is being requested is known, the amount of bandwidth that must be granted for the mobile station to transmit that message is also known.

FIG. 6 depicts a resource structure for the bandwidth request using the OFDMA physical layer, for use with embodiments of the present disclosure. In IEEE 802.16m, a bandwidth request channel is made up of three distributed bandwidth request tiles, where each bandwidth request tile is defined as six contiguous subcarriers by six OFDM symbols as shown in FIG. 6. The basic concept of OFDMA and the concept of a physical layer resource unit configuration in IEEE 802.16m are described in the "0010r2" and "0003r9a" documents.

Each bandwidth request tile includes preamble sequences $Pr_0$-$Pr_{23}$ These are the preamble sequences for the bandwidth request indicator. The quick access message code words $M_0$-$M_{35}$ are distributed over all three bandwidth request tiles. The physical layer OFDMA resource is designed to support both the 3-step and 5-step bandwidth request procedures. A mobile station transmits either the bandwidth request indicator only (in the case of a 5-step bandwidth request) or both the bandwidth request indicator and a quick access message (in the case of a 3-step bandwidth request procedure).

The bandwidth request indicator is an access sequence or preamble sequence having a length of 24 bits. The 802.16m standard defines 24 orthogonal access sequences, each having a 24-bit length. If a mobile station has a message type for which the 3-step bandwidth request can be used, then the mobile station chooses one of the 24 sequences corresponding to the specific type. The mobile station then transmits both the preamble sequence (as a bandwidth request indicator) and the quick access message to the base station. To aid efficient transmission, a portion of the quick access message may be transmitted in the preamble index. Several embodiments are described below that map a portion of the quick access message to the preamble index.

Upon receipt of the bandwidth request indicator, the base station decodes the bandwidth request indicator, then proceeds to detect the quick access message. The quick access message is meant to be coherently decoded. The channel estimates for coherent detection of the quick access message are derived by using the detected bandwidth request indicator sequence as the pilot sequence. The design shown in FIG. 6 detailing the placement of bandwidth request indicator and quick access message facilitates such channel estimation and coherent decoding.

The quick access message may consist of a sequence of B bits that contains: (1) a sequence of bits uniquely identifying the mobile station, and (2) the type of message for which the bandwidth is being requested. The type of message may include: (1) the priority for the message, (2) the flow ID of the message, and/or (3) a predefined message type. In an example of such an arrangement, a quick access message may contain a 12 bit MSID followed by a 4 bit message type, thus giving the quick access message a total of 16 bits. Therefore, given that a part of the quick access message is transmitted in the data portion of the BWREQ channel, the remaining bits can be identified using the preamble index.

One way to identify the remaining bits using the preamble index is to define a one-to-one mapping between the type of message and the bandwidth request indicator preamble sequence. As an example, assume VOIP(AMR) full rate packet is message type 1 and is mapped to preamble index 1. Upon receiving the preamble index 1, the base station knows that the bandwidth size requested is for a VOIP(AMR) full rate packet. The base station uses the preamble sequence to estimate the channel in each tile and then uses the channel estimate to coherently decode the quick access message, which contains the mobile station ID (STIR). On successful decoding of the quick access message, the base station can grant uplink bandwidth to the mobile station requesting to send the VOIP(AMR) full rate packet.

While such a one-to-one mapping solves the problem of indicating the BWREQ size for a 3-step bandwidth request procedure, it may not be an efficient one. For example, if more than two users are requesting bandwidth for the same VOIP (AMR) full rate packet, the base station, while being able to resolve the BWREQ size, may not be able to estimate the channel from each user to the base station, and consequently cannot decode the quick access message. As a result, a collision between multiple mobile users may occur.

Using the embodiments described below, collisions can be mitigated for cases where more than one user uses bandwidth request for the same service. The disclosed embodiments provide various solutions where mapping of the preamble index depends not just on the BWREQ size, but also on the mobile station-specific STID.

In the following embodiments, methods for mapping the B bits of the quick access message for the 3-step BWREQ message are described. The BWREQ message includes $B_{MS}$ bits of the STID and the remaining ($B-B_{MS}$) bits indicating bandwidth request size in the preamble index. For ease of explanation, bits $b_0,b_1,b_2,\ldots,b_{B_{MS}-1}$ are defined as the unique STID associated with the mobile station. The remaining bits $d_0,d_1,d_2,\ldots,d_{(B-B_{MS}-1)}$ are defined as the bandwidth size/priority indicator (BWSize). These bits are used to generate a 3-bit index $p_0,p_1,p_2$, as described below. The decimal equivalent of the binary 3-bit index points to the index of the preamble sequence transmitted. A portion of the bits containing the station ID as well as the BWSize forms the quick access message. The preamble sequence and the quick access message are then transmitted to the base station in the bandwidth request channel. The base station extracts the preamble index from the preamble sequence and the bits are decoded from the quick access message. Both the preamble index and the quick access message bits are used to reconstruct both the STID and BWSize at the base station.

In one embodiment, bits $b_0,b_1,b_2,\ldots,b_{B_{MS}-1}$ are grouped into 3 groups, where each group contains $k=\lceil B_{MS}/3 \rceil$ bits. A parity bit is generated for each of the 3 groups, and the preamble index (the decimal equivalent of the bits) is generated as shown below:

$$p_i = \mathrm{mod}\left(b_i + b_{i+3} + b_{i+6} + \ldots + b_{i+\lfloor \frac{b_{MS}}{3} \rfloor -1} + d_{(B-B_{MS}-1)-2+i}, 2\right), \quad 0 \leq i < 3$$

As an example, assume the quick access message is configured as a set of 16 bits, $s_0,s_1,s_2,\ldots,s_{15}$. Further assume the STID is 12 bits (indicated as $b_0,b_1,b_2,\ldots,b_{11}$) and the BWSize is 4 bits (indicated as $d_0, d_1, d_2, d_3$). Then the 3 bits whose decimal equivalent forms the preamble index are defined as shown below:

$$p_i = \mathrm{mod}(b_1 + b_{i+3} + b_{i+6} + b_{i+9} + d_{i+1}, 2) \quad 0 \leq i < 3$$

where mod is the modulo operator (bit wise XOR operation). The bits $b_0, b_1, b_2, \ldots, b_{11}, d_0$ are carried in the data portion of the BWREQ tile.

A mapping is defined between the quick access message and the data+preamble sequence portion of the message as shown below. Let $b_0, b_1, b_2, \ldots, b_{12}$ be the bits carried in the data portion of the BWREQ tile and $b_{13}, b_{14}, b_{15}$ be the bits that indicate the preamble index. Then, $$b_0, b_1, b_2, \ldots, b_{12}, b_{13}, b_{14}, b_{15} = s_0, s_1, s_2, \ldots, s_{12}, p_0, p_1, p_2$$

where $p_i = \mathrm{mod}(s_i + s_{i+3} + s_{i+6} + s_{i+9} + s_{i+13}, 2) \quad 0 \leq i < 3$ When a base station receives the BWREQ message from the mobile station, it processes the message. For example, the base station determines the preamble index corresponding to the received preamble sequence in the BWREQ message. The preamble index corresponds to the 3 parity bits. The base station then determines a 13-bit portion of the BWREQ message from the quick access message. The base station groups the 13 bits into 3 groups, each group having a substantially equal number of bits. The base station then distributes the 3 parity bits to the 3 groups. The base station then recovers the 3-bit portion of the 16-bit message using a bit-wise XOR operation on the bits in the each of the 3 groups.

In another example, the quick access message is configured as a set of 15 bits, $s_0, s_1, s_2, \ldots, s_{14}$, where the bit string is composed of 12 bit STID and a 3 bit BWSize. A mapping is defined between the quick access message and the data+preamble sequence portion of the message as shown below. Let $b_0, b_1, b_2, \ldots, b_{11}$ be the bits carried in the data portion of the BWREQ tile and $b_{12}, b_{13}, b_{14}$ be the bits that indicate the preamble index. Then:

$$b_0, b_1, b_2, \ldots, b_{11}, b_{12}, b_{13}, b_{14} = s_0, s_1, s_2, \ldots s_{11}, p_0, p_1, p_2$$

where $p_i = \mathrm{mod}(s_i + s_{i+3} + s_{i+6} + s_{i+9} + s_{i+12}, 2) \quad 0 \leq i < 3$ In another embodiment of the present disclosure, bits $b_0, b_1, b_2, \ldots, b_{B_{MS}-1}$ are grouped into 3 groups, with each group containing $k = \lfloor B_{MS}/3 \rfloor$ bits. A parity bit is defined for each of the 3 groups. The 3 parity bits $b_{PG1}, b_{PG2}, b_{PG3}$ are defined as shown below:

$$b_{PG1} = \mathrm{mod}(b_0 + b_1 + b_2 + \ldots + b_k, 2)$$

$$b_{PG2} = \mathrm{mod}(b_{k+1} + b_{k+2} + \ldots + b_{2k}, 2)$$

$$b_{PG3} = \mathrm{mod}(b_{2k+1} + b_{2k+2} + \ldots + b_{3k}, 2)$$

However, in this embodiment, the 3 parity bits do not simply become the 3 bits of the preamble index. Instead, the preamble index bits $p_0, p_1, p_2$ are mapped as shown below:

Preamble Index $p_0 = \mathrm{mod}(d_{(B-Bms-1)-2} + b_{PG1}, 2)$

Preamble Index $p_1 = \mathrm{mod}(d_{(B-Bms-1)-1} + b_{PG2}, 2)$

Preamble Index $p_2 = \mathrm{mod}(d_{(B-Bms-1)} + b_{PG3}, 2)$.

Several other embodiments follow. One of the benefits of all of the following embodiments is that they may reduce and/or avoid the chances of collisions where more than one user requests the same service.

In another embodiment of the present disclosure, the STID bit sequence $b_0, b_1, b_2, \ldots, b_{B_{MS}-1}$ is first randomized using a randomizer function $\pi(.)$ that permutes the indices of the bit sequence. In order to decode the randomizer function, $\pi(.)$ must be known to both the mobile station as well as the base station. In the art, the randomizer $\pi(.)$ is also known as an interleaver. Let the sequence $b_0', b_1', \ldots, b_{B_{MS}-1}' = \pi(b_0, b_1, \ldots, b_{B_{MS}-1})$ be the randomized bit sequence. The 3 parity bits can then be generated as described in the preceding embodiment. First, the randomized bits $b_0', b_1', \ldots, b_{B_{MS}-1}'$ are grouped into 3 groups, with each group containing $k = \lfloor B_{MS}/3 \rfloor$ bits. Then, a parity bit is defined for each of the 3 groups. The 3 parity bits bp(v, bPG2, bp(13 are defined as shown below:

$$b_{PG1} = \mathrm{mod}(b_0' + b_1' + \ldots + b_k', 2)$$

$$b_{PG2} = \mathrm{mod}(b_{k+1}' + b_{k+2}' + \ldots + b_{2k}', 2)$$

$$b_{PG3} = \mathrm{mod}(b_{2k+1}' + b_{2k+2}' + \ldots + b_{3k}', 2).$$

Then, the preamble index bits $p_0, p_1, p_2$ are mapped as shown below:

Preamble Index $p_0 = \mathrm{mod}(d_{(B-Bms-1)-2} + b_{PG1}, 2)$

Preamble Index $p_1 = \mathrm{mod}(d_{(B-Bms-1)-1} + b_{PG2}, 2)$

Preamble Index $p_2 = \mathrm{mod}(d_{(B-Bms-1)} + b_{PG3}, 2)$.

Figure 7:
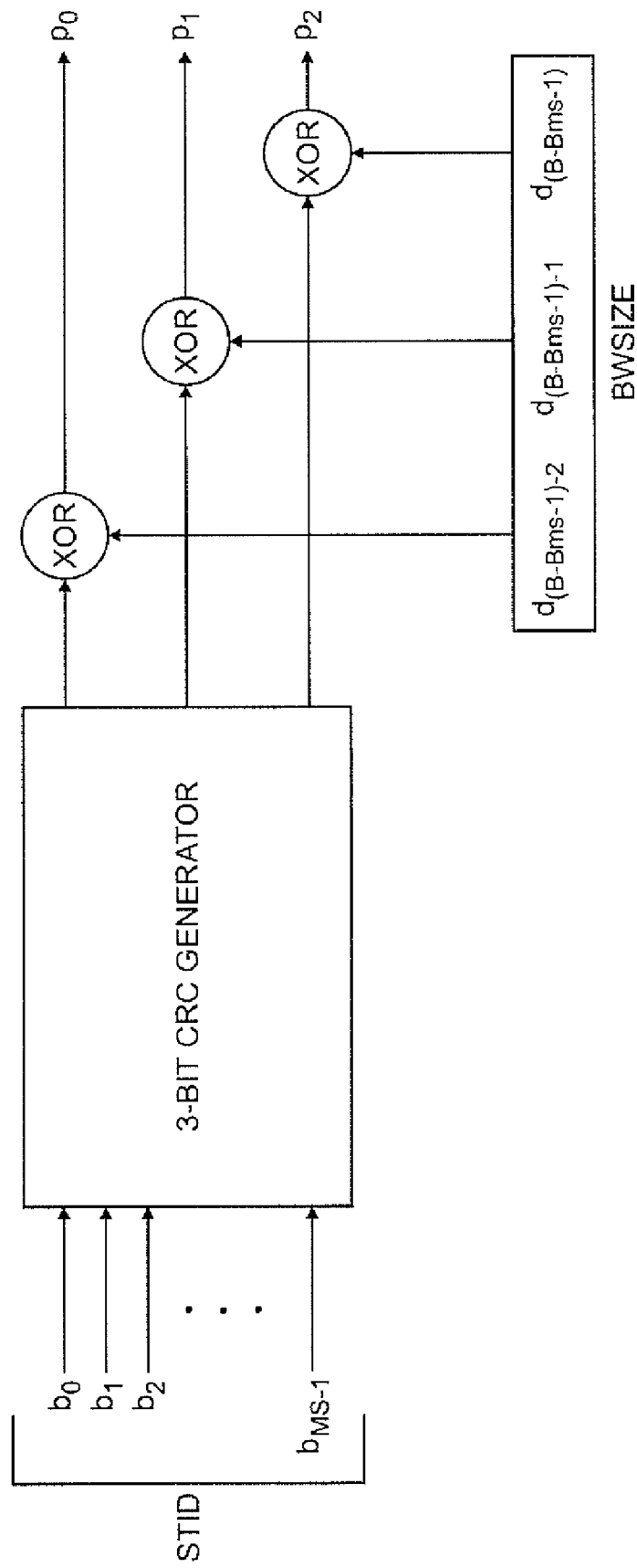
FIG. 7 depicts a method for indexing preamble sequences, according to an embodiment of the present disclosure.

FIG. 7 depicts a method for indexing preamble sequences, according to another embodiment of the present disclosure. As shown in FIG. 7, a 3 bit cyclic redundancy check (CRC) is generated from the $E_{MS}$ bits of the STID. A bit wise XOR operation (modulo 2 addition) is used to add the 3 bit CRC with the 3 bit BWSize indicator to generate the preamble indices $p_0, p_1$ and $p_2$.

In another embodiment of the present disclosure, the STID bits $b_0, b_1, b_2, \ldots, b_{B_{MS}-1}$ are mapped into three parity bits $b_{PG1}, b_{PG2}, b_{PG3}$ using a hash function. The hash value HV is the decimal result of the modulo 3 operation on the STID value as described in the equation below:

$$HV = \mathrm{mod}\left(\sum_{i=0}^{B_{MS}-1} 2^i b_i, 3\right).$$

Next, the bits $b_{PG1}, b_{PG2}, b_{PG3}$ are defined as the binary equivalent of the decimal value HV. The preamble index bits $p_0, p_1, p_2$ are then mapped as shown below:

Preamble Index $p_0 = \mathrm{mod}(d_{(B-Bms-1)-2} + b_{PG1}, 2)$

Preamble Index $p_1 = \mathrm{mod}(d_{(B-Bms-1)-1} + b_{PG2}, 2)$

Preamble Index $p_2 = \mathrm{mod}(d_{(B-Bms-1)} + b_{PG3}, 2)$ where mod is the modulo operator.

In another embodiment of the present disclosure, the three bits of the preamble index are derived by concatenating x bits from the $B_{MS}$ bits of the STID and the remaining (3-x) bits from the 3 bit BWSize. As an example, assume the quick access message is configured as a set of 16 bits, $s_0, s_1, s_2, \ldots, s_{15}$, where the bit string is composed of STID and BWSize. A mapping is defined between the quick access message and the data+preamble sequence portion of the message as follows: Let $b_0, b_1, b_2, \ldots, b_{12}$ be the bits carried in the data portion of the BWREQ tile and $b_{13}, b_{14}, b_{15}$ be the bits that indicate the preamble index. Then:

$$b_0, b_1, b_2, \ldots, b_{12}, b_{13}, b_{14}, b_{15} = s_0, s_1, s_2, \ldots, s_{10}, s_{13}, s_{14}, s_{15}, s_{11}, s_{12}$$

Thus, this method moves some of the bits of the STID toward the end of the quick access message.

In another embodiment of the present disclosure, if a STID is assigned to a mobile station incrementally, starting from the least significant bit (LSB), in certain cases some of the most significant bits (MSB) bits of STID may be zero. For example, for a femtocell base station whose coverage may only have a few mobile stations, then only the assigned LSB bits may be used to generate the three bits index. If only 3 LSB bits $b_0, b_1, b_2$ are assigned values, then the preamble index bits may be mapped as shown below:

$p_0=b_0, p_1=b_1, p_2=b_2$, or $p=\pi(b_0 b_1 b_2)$ where $\pi(.)$ is a randomization function.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. For use in a wireless communication network, a mobile station configured to determine a preamble sequence from a set of indexed preamble sequences by generating an index of the preamble sequence from a B-bit message, the mobile station comprising:
a processor configured to:
group the B bits of the message into n groups, each group having a substantially equal number of bits;
generate a parity bit from each of the n groups; and
determine the index of the preamble sequence based on the n parity bits; and
transceiver circuitry configured to transmit the preamble sequence corresponding to the index of the preamble sequence.

2. The mobile station as set forth in claim 1, wherein $B_{MS}$ bits of the B-bit message comprise a mobile station ID, $(B-B_{MS})$ bits of the B-bit message comprise a bandwidth indicator, n=3, and each parity bit is generated by:

$$p_i = \mathrm{mod}\left(b_i + b_{i+3} + b_{i+6} + \ldots + b_{i+\left\lfloor\frac{b_{MS}}{3}\right\rfloor - 1} + d_{(B-B_{MS}-1)-2+i}, 2\right),$$

$0 \le i < 3$, wherein $b_0, b_1, b_2, L, b_{B_{MS}-1}$ represent the $B_{MS}$ bits of the mobile station ID,
wherein $d_0, d_1, d_2, L, d_{(B-B_{MS}-1)}$ represent the $(B-B_{MS})$ bits of the bandwidth indicator, and
wherein mod (.,2) represents a bitwise XOR operation.

3. The mobile station as set forth in claim 1, wherein the index of the preamble sequence is determined by a decimal equivalent of the n parity bits.

4. The mobile station as set forth in claim 1, wherein the mobile station is further configured to transmit a portion of the B-bit message in a quick access message along with the preamble sequence.

5. The mobile station as set forth in claim 2, wherein the mobile station is further configured to randomize the $B_{MS}$ bits of the mobile station ID using a $\pi(.)$ randomizer function before generating the plurality of parity bits.

6. For use in a wireless communication network, a base station configured to process a B-bit message from a mobile station, the message including a preamble sequence and a quick access message, the base station comprising:
transceiver circuitry configured to receive the message from the mobile station; and
a processor configured to:
determine a preamble index corresponding to the received preamble sequence, the preamble index corresponding to n parity bits;
determine a (B−n) bit portion of the B bit message from the quick access message;
group the (B−n) bits into n groups, each group having a substantially equal number of bits;
distribute the n parity bits to the n groups; and
recover the n bit portion of the B bit message using a bit-wise XOR operation on the bits in each of the n groups and each of the n parity bits.

7. The base station as set forth in claim 6, wherein:
a portion of the B-bit message is received using the quick access message and the parity bits;
the entire B-bit message is constructed;
n=3; and
the portion of the message not transmitted in the quick access message is generated by:

$$d_i = \mathrm{mod}\left(b_i + b_{i+3} + b_{i+6} + \ldots + b_{i+\left\lfloor\frac{b_{MS}}{3}\right\rfloor - 1} + p_i, 2\right), \quad 0 \le i < 3$$

wherein:
$b_{MS}$ represents a plurality of bits of the B-bit message that comprise a mobile station ID,
$b_i$ represents the portion of the B-bit message transmitted in the quick access message,
$p_i$ represents the parity bits corresponding to the index of the preamble sequence, and
mod (.,2) represents a bitwise XOR operation.

8. The base station as set forth in claim 6, wherein the parity bits are determined by a binary equivalent of the preamble index of the received preamble sequence.

9. The base station as set forth in claim 7, wherein the $B_{MS}$ bits of the mobile station ID are randomized by a $\pi(.)$ randomizer function.

10. The base station as set forth in claim 6, wherein the base station is configured to receive the message from the mobile station on a bandwidth request channel.

11. For use in a wireless communication network, a mobile station configured to determine a preamble sequence from a set of indexed preamble sequences by generating an index of the preamble sequence from a message, the message having B bits, $B_{MS}$ bits of the B bits comprising a mobile station ID and $(B-B_{MS})$ of the B bits comprising a bandwidth indicator, the mobile station comprising:
a processor configured to:
generate a plurality of parity bits from the $B_{MS}$ station ID bits;
generate a plurality of preamble bits from the plurality of parity bits; and
replace a final plurality of bits of the B-bit quick access message with the plurality of preamble bits.

12. The mobile station as set forth in claim 11, the mobile station further configured to randomize the $B_{MS}$ bits of the mobile station ID using a $\pi(.)$ randomizer function before generating the plurality of parity bits.

13. The mobile station as set forth in claim 11, wherein the plurality of parity bits are represented by:

$$b_{PG1} = \mod(b_0 + b_1 + b_2 + \ldots + b_k, 2)$$

$$b_{PG2} = \mod(b_{k+1} + b_{k+2} + \ldots + b_{2k}, 2)$$

$$b_{PG3} = \mod(b_{2k+1} + b_{2k+2} + \ldots + b_{3k}, 2),$$

wherein the plurality of preamble bits are represented by:

$$p_0 = \mod(d_{(B-Bms-1)-2} + b_{PG1}, 2)$$

$$p_1 = \mod(d_{(B-Bms-1)-1} + b_{PG2}, 2)$$

$$p_2 = \mod(d_{(B-Bms-1)} + b_{PG3}, 2),$$

wherein $b_0, b_1, b_2, L, b_{B_{MS}-1}$ represent the $B_{MS}$ bits of the mobile station ID,
wherein $d_{(B-Bms-1)}$, $d_{(B-Bms-1)-1}$, $d_{(B-Bms-1)-2}$ represent bits of the bandwidth indicator,
wherein $k = \lfloor B_{MS}/3 \rfloor$, and
wherein $\mod(.,2)$ represents a bitwise XOR operation.

14. The mobile station as set forth in claim 11, wherein the plurality of parity bits are generated using a hash function.

15. The mobile station as set forth in claim 11, wherein the plurality of parity bits are generated using a cyclic redundancy check (CRC) generator.

16. A wireless communication network comprising a plurality of mobile stations and at least one base station, each mobile station configured to determine a preamble sequence from a set of indexed preamble sequences by generating an index of the preamble sequence from a B-bit message, each mobile station configured to:
  group the B bits into n groups, each group having a substantially equal number of bits;
  generate a parity bit from each of the n groups;
  determine the index of the preamble sequence based on the n parity bits; and
  transmit to the at least one base station the preamble sequence corresponding to the index of the preamble sequence.

17. The wireless communication network as set forth in claim 16, wherein $B_{MS}$ bits of the B-bit message comprise a mobile station ID, $(B-B_{MS})$ bits of the B-bit message comprise a bandwidth indicator, n=3, and each parity bit is generated by:

$$p_i = \mod\left(b_i + b_{i+3} + b_{i+6} + \ldots + b_{i+\lfloor \frac{b_{MS}}{3} \rfloor - 1} + d_{(B-B_{MS}-1)-2+i}, 2\right),$$

$$0 \leq i < 3,$$

wherein $b_0, b_1, b_2, L, b_{B_{MS}-1}$ represent the $B_{MS}$ bits of the mobile station ID,
wherein $d_0, d_1, d_2, L, d_{(B-B_{MS}-1)}$ represent the $(B-B_{MS})$ bits of the bandwidth indicator, and
wherein $\mod(.,2)$ represents a bitwise XOR operation.

18. The wireless communication network as set forth in claim 16, wherein the index of the preamble sequence is determined by a decimal equivalent of the n parity bits.

19. The wireless communication network as set forth in claim 16, wherein each mobile station is further configured to transmit a portion of the B-bit message in a quick access message along with the preamble sequence.

20. The wireless communication network as set forth in claim 17, where each mobile station is further configured to randomize the $B_{MS}$ bits of the mobile station ID using a $\pi(.)$ randomizer function before generating the plurality of parity bits.

21. For use in a wireless communication network, a base station configured to decode a quick access message, the quick access message comprising a mobile station ID and a bandwidth size/priority indicator, the base station comprising:
  transceiver circuitry configured to receive the quick access message and a preamble sequence from a mobile station; and
  a processor configured to:
    determine a n-bit preamble index corresponding to the received preamble sequence, the preamble index corresponding to n parity bits;
    determine a B-bit portion of the quick access message, wherein $B_{MS}$ bits comprise the mobile station ID and $B-B_{MS}$ bits comprise the bandwidth size/priority indicator;
    recover the n parity bits using a bit-wise XOR operation on then bits of the preamble index and n of the $B-B_{MS}$ bits of the bandwidth size/priority indicator; and
    use the n parity bits to perform a parity check on the $B_{MS}$ bits of the mobile station ID.

22. The base station as set forth in claim 21, the processor further configured to:
  use a $\pi(.)$ randomizer function to randomize the bits of the mobile station ID.

23. The base station as set forth in claim 21, wherein n=3 and the 3 bits of the preamble index are used to recover the 3 parity bits, the 3 recovered parity bits represented by:

$$rb_{PG1} = \mod(d_{(B-Bms-1)-2} + p_0, 2)$$

$$rb_{PG2} = \mod(d_{(B-Bms-1)-1} + p_1, 2)$$

$$rb_{PG3} = \mod(d_{(B-Bms-1)} + p_2, 2),$$

wherein the 3 recovered parity bits are compared to the 3 parity bits, the 3 parity bits represented by:

$$b_{PG1} = \mod(b_0 + b_1 + b_2 + \ldots + b_k, 2)$$

$$b_{PG2} = \mod(b_{k+1} + b_{k+2} + \ldots + b_{2k}, 2)$$

$$b_{PG3} = \mod(b_{2k+1} + b_{2k+2} + \ldots + b_{3k}, 2),$$

wherein $b_0, b_1, b_2, \ldots, b_{B_{MS}-1}$ represent the bits of the mobile station ID,
wherein $d_{(B-Bms-1)}$, $d_{(B-Bms-1)-1}$, $d_{(B-Bms-1)-2}$ represent bits of the bandwidth size/priority indicator,
wherein $k = \lfloor B_{MS}/3 \rfloor$, and
wherein $\mod(.,2)$ represents a bitwise XOR operation.

24. The base station as set forth in claim 21, wherein the plurality of parity bits are generated using a hash function.

25. The base station as set forth in claim 21, wherein the plurality of parity bits are generated using a cyclic redundancy check (CRC) generator.

26. For use in a wireless communication network, a method of indexing a preamble from a set of indexed preamble sequences using a quick access message, the quick access message having B bits, $B_{MS}$ bits of the B bits comprising a mobile station ID and $(B-B_{MS})$ of the B bits comprising a bandwidth indicator, the method comprising the steps of:
  grouping the $B_{MS}$ bits and $(B-B_{MS})$ bits into three groups, each group having a substantially equal number of bits;
  generating a parity bit for each of the three groups; and
  replacing a final three bits of the B-bit quick access message with the three parity bits.

27. The method as set forth in claim 26, wherein each parity bit is represented by:

$$p_i = \text{mod}\left(b_i + b_{i+3} + b_{i+6} + \ldots + b_{i+\left\lfloor \frac{b_{MS}}{3} \right\rfloor - 1} + d_{(B-B_{MS}-1)-2+i}, 2\right),$$
$$0 \le i < 3$$

wherein $b_0, b_1, b_2, L, b_{B_{MS}-1}$ represent the $B_{MS}$ bits of the mobile station ID,
wherein $d_0, d_1, d_2, L, d_{(B-B_{MS}-1)}$ represent the $(B-B_{MS})$ bits of the bandwidth indicator, and
wherein mod(.,2) represents a bitwise XOR operation.

28. The method as set forth in claim 26, wherein the quick access message is used in a bandwidth request channel.

29. The method as set forth in claim 26, wherein the bandwidth indicator is a bandwidth size/priority indicator.

30. For use in a wireless communication network, a method of indexing a preamble from a set of indexed preamble sequences using a quick access message, the quick access message having B bits, $B_{MS}$ bits of the B bits comprising a mobile station ID and $(B-B_{MS})$ of the B bits comprising a bandwidth indicator, the method comprising the steps of:
  generating a plurality of parity bits from the $B_{MS}$ station ID bits;
  generating a plurality of preamble bits from the plurality of parity bits; and
  replacing a final plurality of bits of the B-bit quick access message with the plurality of preamble bits.

31. The method as set forth in claim 30, further comprising the step of:
  before generating the plurality of parity bits, randomizing the $B_{MS}$ bits of the mobile station ID using a $\pi(.)$ randomizer function.

32. The method as set forth in claim 30, wherein the plurality of parity bits are represented by:

$$b_{PG1} = \text{mod}(b_0 + b_1 + b_2 + \ldots + b_k, 2)$$

$$b_{PG2} = \text{mod}(b_{k+1} + b_{k+2} + \ldots + b_{2k}, 2)$$

$$b_{PG3} = \text{mod}(b_{2k+1} + b_{2k+2} + \ldots + b_{3k}, 2),$$

wherein the plurality of preamble bits are represented by:

$$p_0 = \text{mod}(d_{(B-Bms-1)-2} + b_{PG1}, 2)$$

$$p_1 = \text{mod}(d_{(B-Bms-1)-1} + b_{PG2}, 2)$$

$$p_2 = \text{mod}(d_{(B-Bms-1)} + b_{PG3}, 2),$$

wherein $b_0, b_1, b_2, L, b_{B_{MS}-1}$ represent the $B_{MS}$ bits of the mobile station ID,
wherein $d_{(B-Bms-1)}, d_{(B-Bms-1)-1}, d_{(B-Bms-1)-2}$ represent bits of the bandwidth indicator,
wherein $k = \lfloor B_{MS}/3 \rfloor$, and
wherein mod(.,2) represents a bitwise XOR operation.

33. The method as set forth in claim 30, wherein the plurality of parity bits are generated using a hash function.

34. The method as set forth in claim 30, wherein the plurality of parity bits are generated using a cyclic redundancy check (CRC) generator.

35. For use in a base station in a wireless communication network, a method of processing a B-bit message from a mobile station, the message including a preamble sequence and a quick access message, the method comprising:
  receiving the message from the mobile station;
  determining a preamble index corresponding to the received preamble sequence, the preamble index corresponding to n parity bits;
  determining a (B−n) bit portion of the B bit message from the quick access message;
  grouping the (B−n) bits into n groups, each group having a substantially equal number of bits;
  distributing the n parity bits to the n groups; and
  recovering the n bit portion of the B bit message using a bit-wise XOR operation on the bits in each of the n groups and each of the n parity bits.

36. The method as set forth in claim 35, wherein:
  a portion of the B-bit message is received using the quick access message and the parity bits;
  the entire B-bit message is constructed;
  n=3; and
  the portion of the message not transmitted in the quick access message is generated by:

$$d_i = \text{mod}\left(b_i + b_{i+3} + b_{i+6} + \ldots + b_{i+\left\lfloor \frac{b_{MS}}{3} \right\rfloor - 1} + p_i, 2\right), 0 \le i < 3$$

wherein:
  $b_{MS}$ represents a plurality of bits of the B-bit message that comprise a mobile station ID,
  $b_i$ represents the portion of the B-bit message transmitted in the quick access message,
  $p_i$ represents the parity bits corresponding to the index of the preamble sequence, and
  mod (.,2) represents a bitwise XOR operation.

37. The method as set forth in claim 35, further comprising:
  determining the parity bits by a binary equivalent of the preamble index of the received preamble sequence.

38. The method as set forth in claim 36, further comprising:
  randomizing the $B_{MS}$ bits of the mobile station ID by a $\pi(.)$ randomizer function.

39. The method as set forth in claim 35, further comprising:
  receiving the message from the mobile station on a bandwidth request channel.

40. For use in a base station in a wireless communication network, a method of decoding a quick access message, the quick access message comprising a mobile station ID and a bandwidth size/priority indicator, the method comprising:
  receiving the quick access message and a preamble sequence from a mobile station;
  determining a n-bit preamble index corresponding to the received preamble sequence, the preamble index corresponding to n parity bits;
  determining a B-bit portion of the quick access message, wherein $B_{MS}$ bits comprise the mobile station ID and $B-B_{MS}$ bits comprise the bandwidth size/priority indicator;
  recovering the n parity bits using a bit-wise XOR operation on the n bits of the preamble index and n of the $B-B_{MS}$ bits of the bandwidth size/priority indicator; and
  using the n parity bits to perform a parity check on the $B_{MS}$ bits of the mobile station ID.

41. The method as set forth in claim 40, the method further comprising:
  randomizing the bits of the mobile station ID using a $\pi(.)$ randomizer function.

42. The method as set forth in claim 40, wherein n=3 and the 3 bits of the preamble index are used to recover the 3 parity bits, the 3 recovered parity bits represented by:

$$rb_{PG1} = \mod(d_{(B-Bms-1)-2} + p_0, 2)$$

$$rb_{PG2} = \mod(d_{(B-Bms-1)-1} + p_1, 2)$$

$$rb_{PG3} = \mod(d_{(B-Bms-1)} + p_2, 2),$$

wherein the 3 recovered parity bits are compared to the 3 parity bits, the 3 parity bits represented by:

$$b_{PG1} = \mod(b_0 + b_1 + b_2 + \ldots + b_k, 2)$$

$$b_{PG2} = \mod(b_{k+1} + b_{k+2} + \ldots + b_{2k}, 2)$$

$$b_{PG3} = \mod(b_{2k+1} + b_{2k+2} + \ldots + b_{3k}, 2),$$

wherein $b_0, b_1, b_2, \ldots, b_{B_{MS}-1}$ represent the bits of the mobile station ID, wherein $d_{(B-Bms-1)}$, $d_{(B-Bms-1)-1}$, $d_{(B-Bms-1)-2}$ represent bits of the bandwidth size/priority indicator, wherein $k = \lfloor B_{MS}/3 \rfloor$, and wherein $\mod(.,2)$ represents a bitwise XOR operation.

43. The method as set forth in claim 40, further comprising: generating the plurality of parity bits using a hash function.

44. The method as set forth in claim 40, further comprising: generating the plurality of parity bits using a cyclic redundancy check (CRC) generator.

* * * * *